(12) United States Patent
Sarnoff et al.

(10) Patent No.: US 8,844,755 B2
(45) Date of Patent: Sep. 30, 2014

(54) NESTED PAN AND FOLDED PAN COVER

(71) Applicant: Handi-Foil Corporation, Wheeling, IL (US)

(72) Inventors: Norton Sarnoff, Northbrook, IL (US); Raj Patel, Lake Zurich, IL (US)

(73) Assignee: Handi-Foil Corporation, Wheeling, IL (US)

( * ) Notice: Subject to any disclaimer, the term of this patent is extended or adjusted under 35 U.S.C. 154(b) by 10 days.

(21) Appl. No.: 13/779,918

(22) Filed: Feb. 28, 2013

(65) Prior Publication Data

US 2014/0238997 A1  Aug. 28, 2014

(51) Int. Cl.
*B65D 1/34* (2006.01)
*A47J 27/00* (2006.01)

(52) U.S. Cl.
CPC .............. *A47J 27/00* (2013.01); *Y10S 220/912* (2013.01); *Y10S 229/93* (2013.01)
USPC ........ 220/573.1; 220/618; 220/620; 220/621; 220/669; 220/912; 229/5.6; 229/5.82; 229/125.01; 229/125.36; 229/930

(58) Field of Classification Search
USPC .............. 220/573.1, 618, 620, 621, 669, 912; 229/5.6, 5.82, 125.36, 125.01, 930
See application file for complete search history.

(56) References Cited

U.S. PATENT DOCUMENTS

| | | | | |
|---|---|---|---|---|
| 3,021,990 | A | * | 2/1962 | Duskey .......................... 206/519 |
| 3,516,597 | A | * | 6/1970 | Bigelow .................... 229/125.36 |
| 4,530,440 | A | * | 7/1985 | Leong ............................ 220/201 |
| 5,111,953 | A | * | 5/1992 | Faust et al. ..................... 220/214 |
| 2005/0241977 | A1 | * | 11/2005 | Herbert et al. ................. 206/515 |

* cited by examiner

*Primary Examiner* — Elizabeth Volz
(74) *Attorney, Agent, or Firm* — Adam K. Sacharoff; Much Shelist

(57) ABSTRACT

There is provided a packaged pan and lid that includes at least two nested pans and at least two lids. Each lid has at least two bi-lateral fold lines, such that the lid is configurable into a folded configuration and removable secured within a well of a corresponding pan. The lid being removable from the well and unfolded to a substantially flat configuration. The lid may then be placed on the rim of the pan, such that a lip of the pan can be bent over the edge of the lid.

24 Claims, 8 Drawing Sheets

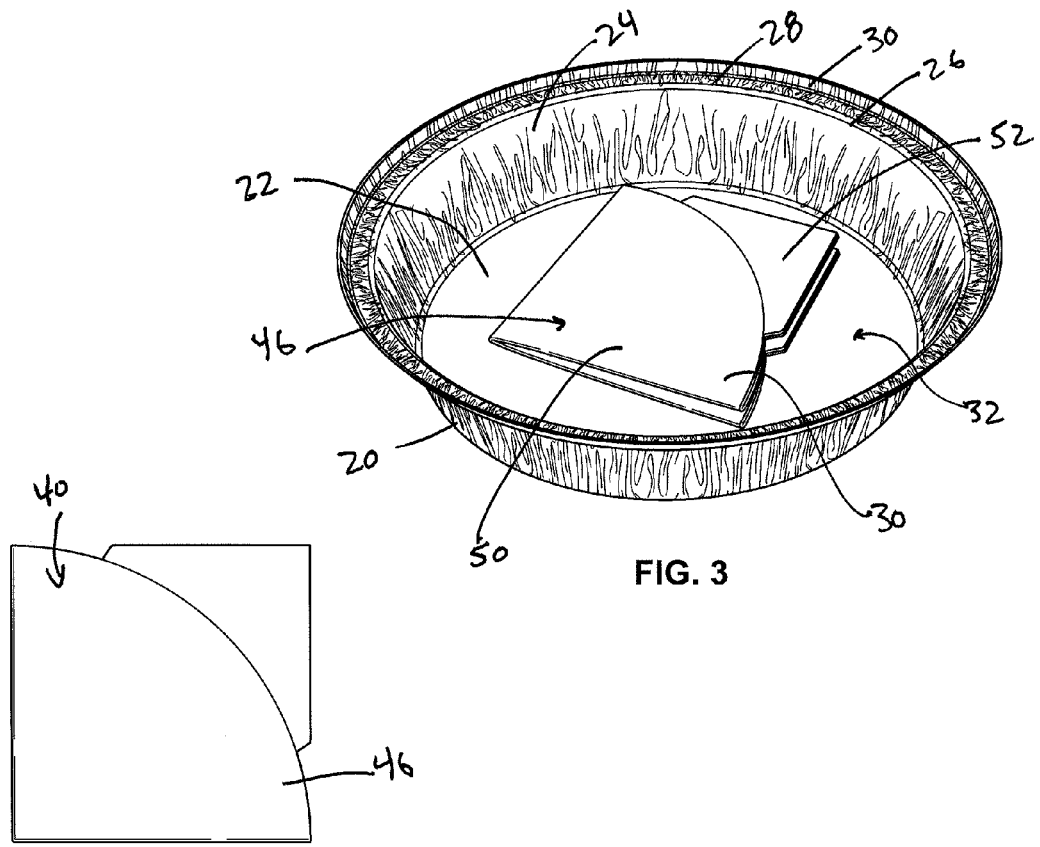
FIG. 3
FIG. 4
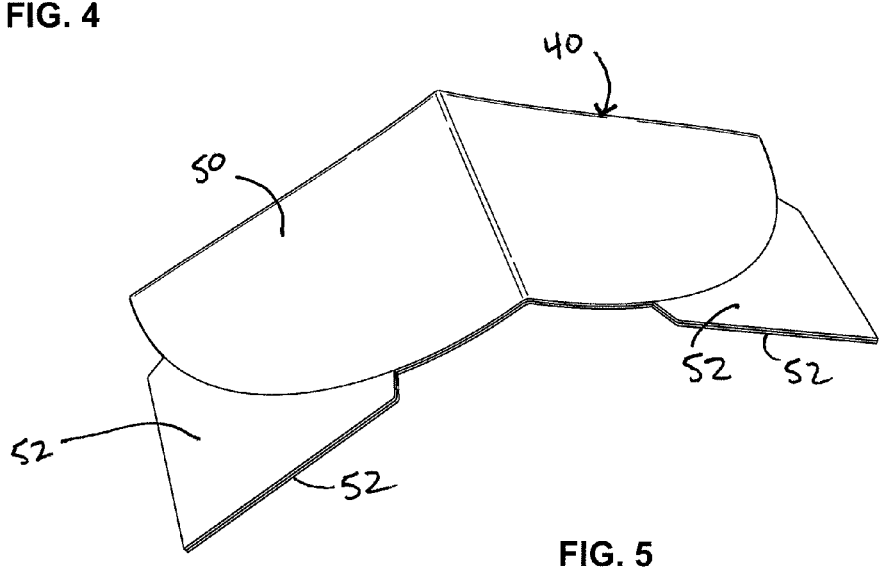
FIG. 5

NESTED PAN AND FOLDED PAN COVER

FIELD OF THE INVENTION

The present invention relates to the art of packaging foil pans and similar items, and more particularly, the present invention is directed to a packaging one or more foil pans with folded pan covers to form a packaged assembly.

BACKGROUND OF THE INVENTION

Foil pans are typically displayed in stores and sold to consumers as part of a packaged assembly. Such foil pans may be round, square, or oval and are made out of aluminum foil typically having a thickness of from about 30 to 45 gauge. The packaged assembly generally includes a plurality of foil pans, nested together, and packaging to hold the foil pans together. Labels are also often provided, placed either on the packaging or on the foil pans themselves. The packaged assembly may be displayed in the store resting on a shelf in a horizontal orientation. However, the packaging may also include means for hanging the packaged assembly so that it may be displayed in a vertical orientation, such as hanging from a display rack.

One problem with packaging pans with lids is that once the covers for the pans are rested on top of the pan, there is no way to properly nest the remaining pans. In these circumstances pans would have to be stacked. Stacking pans takes up a great deal of shelf space and is never the preferred method of displaying the products. As such, there is a need to provide for the ability to nest pans with lids while at the same time providing for an easier method of stacking pans to save shelf space.

SUMMARY OF THE INVENTION

In accordance with the present invention there is provided in one embodiment of the invention a packaged pan and lid comprising at least two nested pans and at least two lids, one lid corresponding to a pan. Each pan has a well with a bottom surface and a single continuous wall surface extending upwardly from the bottom surface, a rim extending outwardly from an upper edge of the wall surface and a lip extending upwardly from a terminus of the rim, and wherein one of the nested pans is positioned in the other nested pan such that the wells of the nested pans substantially abut each other. Each lid has at least two bi-lateral fold lines across the lid, such that the lid is configurable into a folded configuration. The lid being configured into the folded configuration and being removable secured within the well of a corresponding pan, such that the lid is removable from the well and unfolded to a substantially flat configuration. The lip of the pan is configured to bend over the edge of the lid when the lid is unfolded to a substantially flat configuration and positioned such that the perimeter of the lid is positioned on the rim. Lastly, a band made out of a heat-shrinkable plastic may be placed around the outwardly-extending rim and lip of the nested pans.

The pans and lids may have an elliptical shaped configuration or a polygonal shaped configuration. One type of elliptical configuration would include the circular shaped configuration shown in the attached drawings. Similarly, the polygonal shaped configuration may be the rectangular shaped configuration shown in the attached drawings.

In a circular configuration, the lid further includes a pair of cross bi-lateral folding lines, such that the lids have a folded configuration that is sized to be about a quarter of the unfolded substantially flat configuration. In the rectangular configuration the lid may include a pair of bi-lateral folding lines, such that the lid has a folded configuration that is sized to be about a third of the unfolded substantially flat configuration.

The circular lids may further include at least two corner sections removably attached to a perimeter edge of the lid by a perforated edge. The at least two corner sections include an adhesive such that the two corner sections are secured together when the lid is in a folded configuration such that the lid is maintained in the folded configuration until the adhesive between the two corner sections is broken or the two corner sections are removed.

Lastly, lid may include a first surface side that is made of an aluminum material and includes a second surface side that is made of a cardboard material.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 3 is a perspective view of the pan and lid from FIG. 1;

FIG. 4 is a top view of a folded lid FIG. 1;

FIG. 5 is a perspective view of the lid from FIG. 4 being unfolded;

DETAILED DESCRIPTION OF THE EMBODIMENTS

Figure 1:
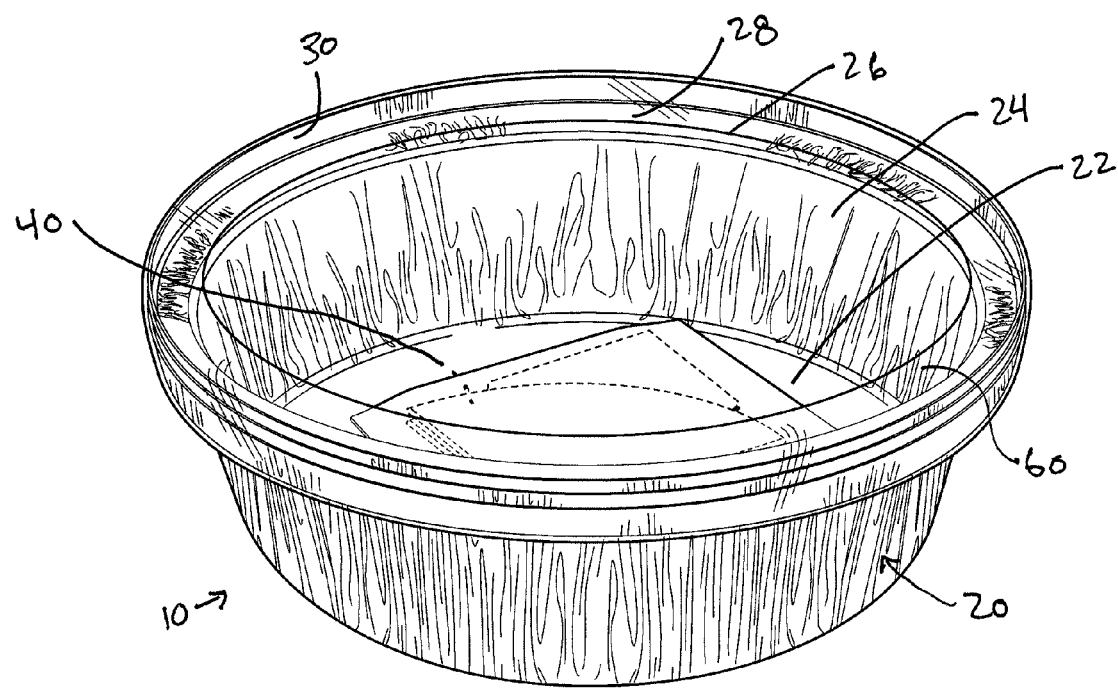
FIG. 1 is a perspective view of the packaged pans and lids illustrated in accordance to a first embodiment of the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 2:
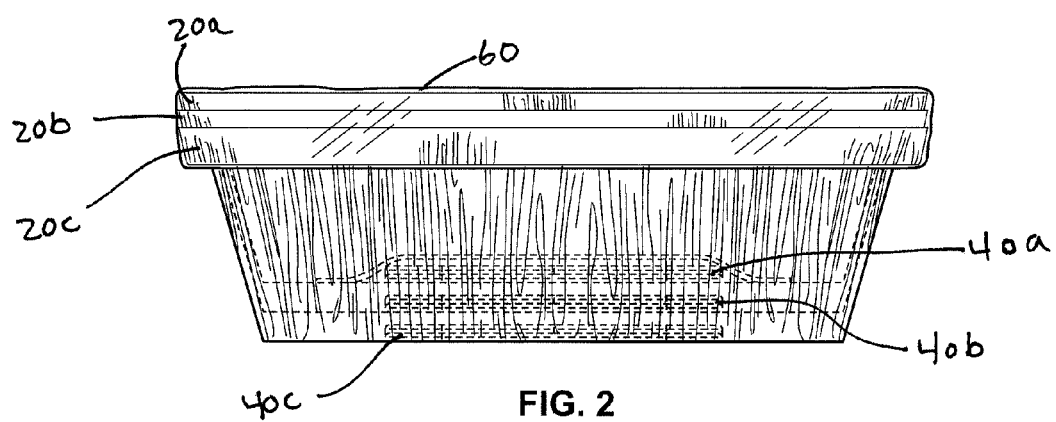
FIG. 2 is a side view of FIG. 1.

With reference to FIGS. 1 and 2, a first preferred embodiment of a packaged assembly 10 which includes at least three nested pans 20 (20a, 20b, 20c) and pan lids 40 (40a, 40b, 40c) are shown. Each pan includes a well bottom 22 with a single continuous wall surface 24 extending upwardly from the bottom 22. The wall surface 24 terminates at an edge 26 with a rim 28 extending radially outwardly therefrom. Extending upwardly from the rim 28 is a lip 30 configured to be folded over when the lid 40 is placed thereon, thereby securing the edge of the lid 40 to the rim 28 of the pan 20.

Figure 8:
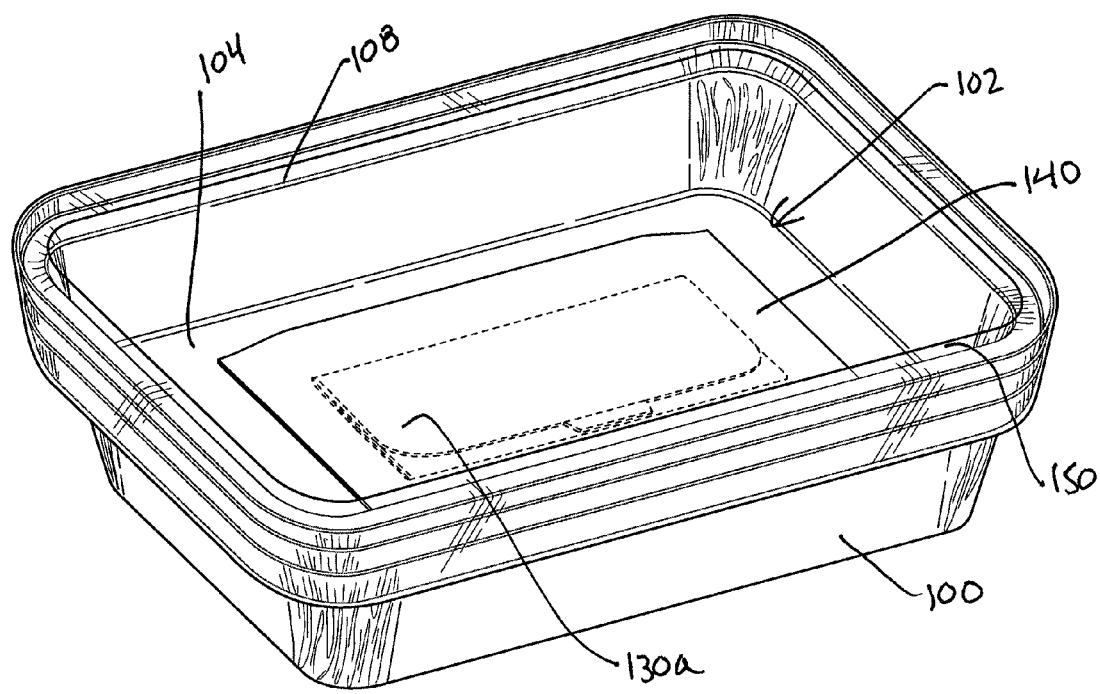
FIG. 8 is a perspective view of the packaged pans and lids illustrated in accordance to a second embodiment of the present invention.
Figure 9:
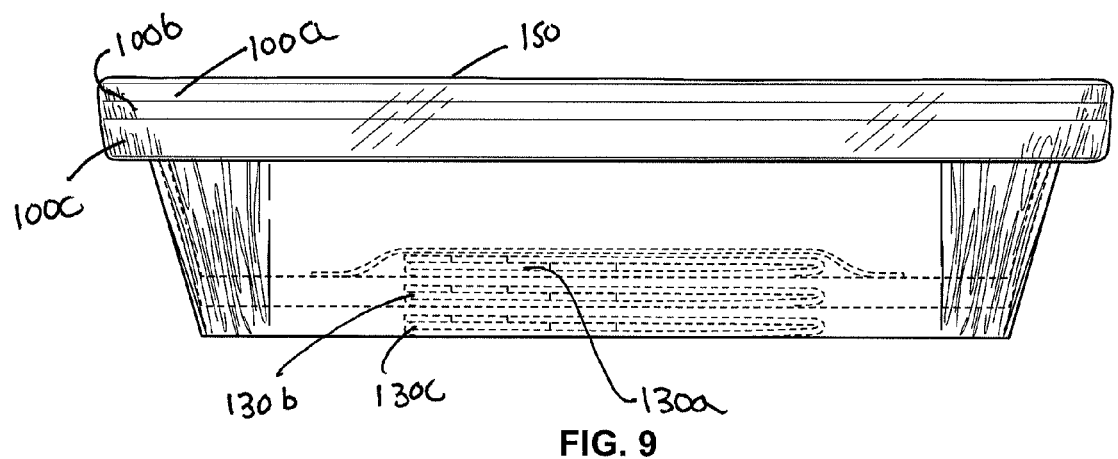
FIG. 9 is a side view of FIG. 8

While the pans are shown in the first embodiment as being elliptical and more particular circular, a quick reference is made to FIGS. 8 & 9 which shows a polygonal pan or rectangular. Other pan shapes would be included within the scope of this invention. In addition, the number of pans while shown as three can change to include simply a single pan or more than one pan.

Continuing to refer to FIGS. 1 and 2, the pans 20 include lids 40. The lids 40 may be separately secured to the well bottom 22 of a corresponding pan. Alternatively, the multiple lids may be packaged together and inserted between a two adjacent pans to prevent the lid attached to the topmost well bottom 22a from being lost or damaged.

Referring now to FIGS. 3-7, there is shown the pan 20 with a lid 40. One important aspect of the present invention is that the lid 40 is folded to permit the lid to fit easily within the well 32. Since the lid 40 in this configuration is circular cross folding lines 42 and 44 (FIGS. 6 & 7) are provided to allow the lid to fold into a quarter configuration 46 (FIG. 4).

Figure 6:
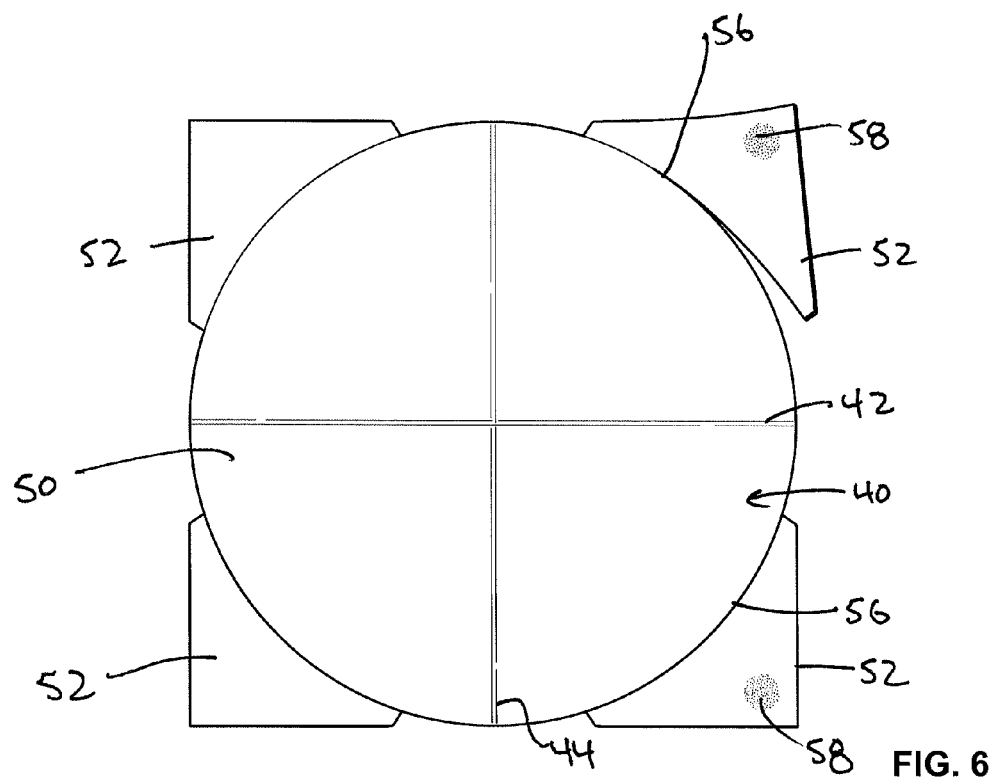
FIG. 6 is a top view of one side of the lid from FIG. 4 unfolded.
Figure 7:
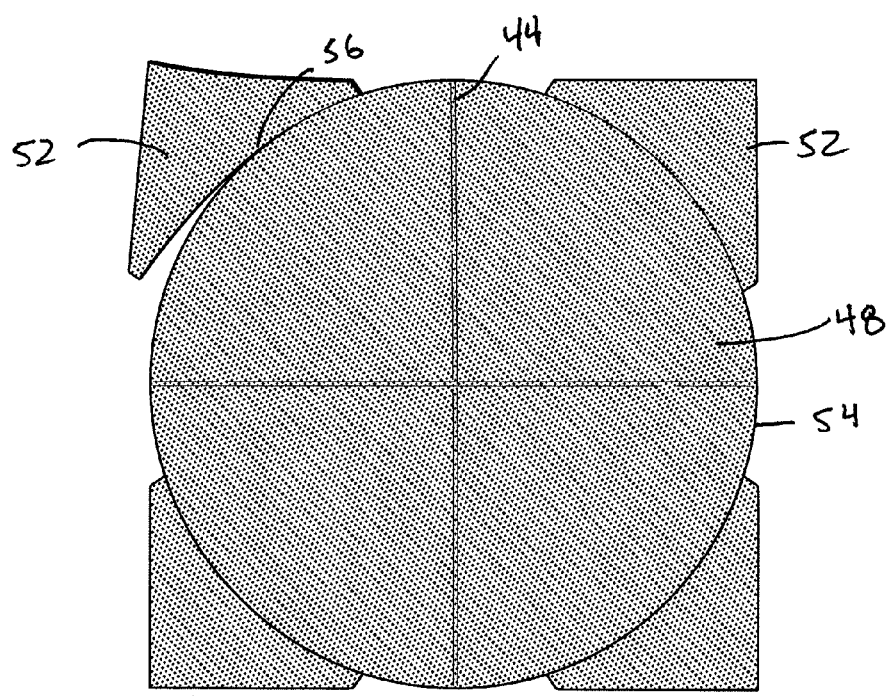
FIG. 7 is a top view of the other side of the lid from FIG. 4 unfolded.

In addition, the surfaces of the lid may be different to help keep packaged food warmer while maintaining the ability to fold the lid. For example, one side 48 of the lid may be aluminum (FIG. 7), while the other side may be made of a thin cardboard 50 (FIG. 6). The cardboard permits the lid to be folded for packaging and unfolded for use, while the aluminum side provides for the ability to keep moisture out and/or help maintain the heat within the pan when closed and re-heating.

The lids 40 may also include corner edges 52 secured to the perimeter 54 of the lid 40. The corner sections 48 are attached to the perimeter 54 by a perforated edge 56 to allow the corner sections 52 to tear away easily. The corner sections 52 provide a surface that can be glued 58 to each other to keep the lid in a folded position. In addition, a corner section can be glued to the pan without interfering with one of the surfaces of the lid. As such if glue gets stuck to the corner section it simply will be removed when the corner sections 48 are removed.

Referring back to FIGS. 1 & 2, when packaged the pans may be secured together by a band 60 made out of a heat-shrinkable plastic is placed around the outwardly-extending rim 28 and lip 30 portions of the nested foil pans. Upon the application of heat, the plastic shrinks so as to fit snugly about the top and bottom rims 28, thereby holding the foil pans 20 together.

Referring now to FIGS. 8 and 9, there is shown in a second embodiment a rectangular pan 100. As disclosed above, the pan 100 includes a well 102 with a bottom surface 104. Extending from the edge of the bottom surface is a continuous wall surface 106 terminating at a rim 108. Extending upwardly from the rim 108 is a lip 110, which is configured to be folded over the edge of a lid when placed and rested on the rim 108. The pan 100 is shown nested in a group of three pans (100a, 100b, 100c). Lids 130 (130a, 130b, 130c) are provided and are secured within the well to its corresponding pan. In addition, a label 140 may be placed over each lid 130 to help secure the lid in place, preventing accidental removal of the lid by a consumer or during shipping and handling. Lastly, the pans 100 may be secured together by a band 150 made out of a heat-shrinkable plastic is placed around the outwardly-extending rim 108 and lip 110 portions of the nested foil pans. Upon the application of heat, the plastic shrinks so as to fit snugly about the top and bottom rims 108, thereby holding the foil pans 100 together.

Figure 10:
FIG. 10 is a side view of the folded lid from FIG. 8.
Figure 11:
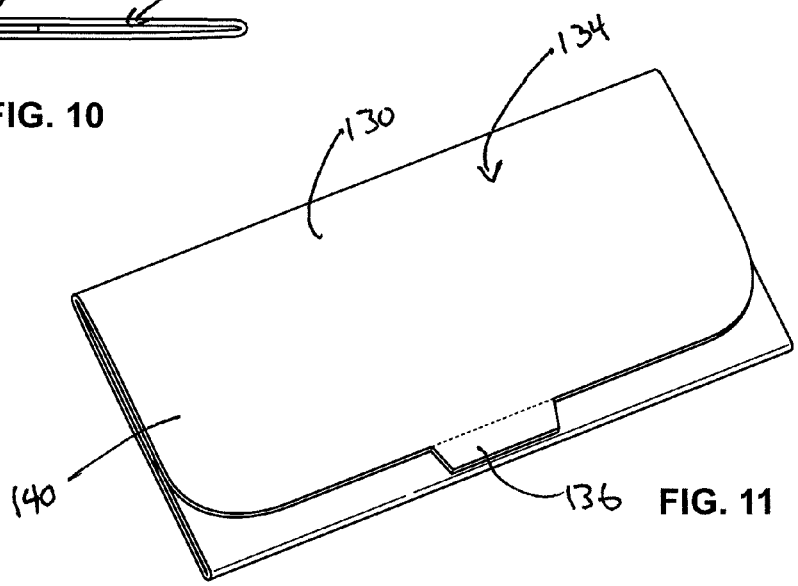
FIG. 11 is a perspective view of the lid from FIG. 8.
Figure 12:
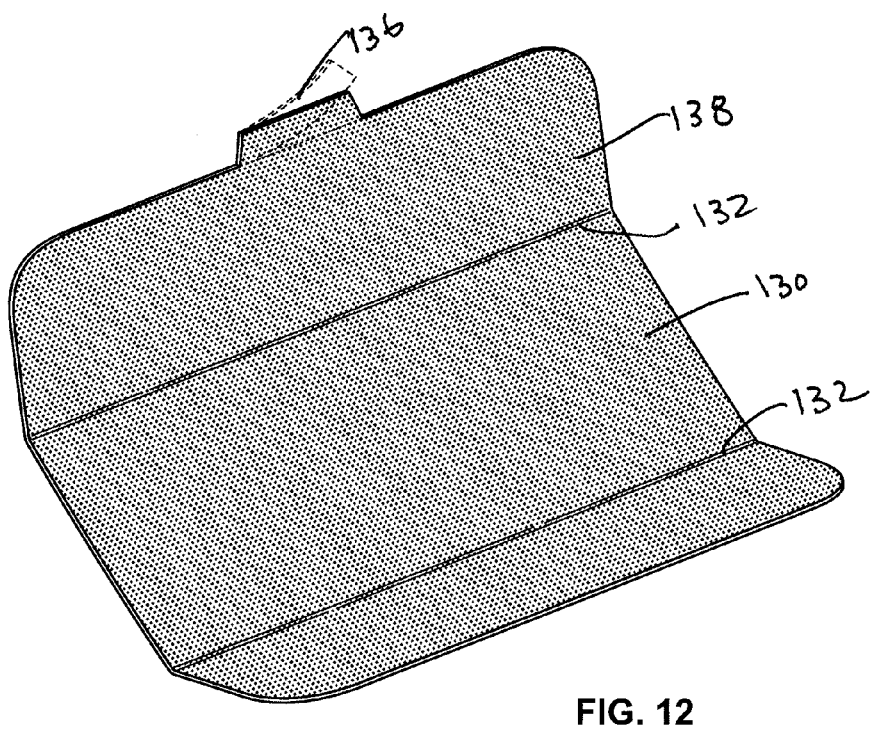
FIG. 12 is a unfolded view of the lid from FIG. 8.

Referring now to FIGS. 10 12, the lids 130 may be designed with two lateral folding lines 132 such that the folded lid 134 can easily rest within the well 102 of the pan. The lid 130 may also include a removable tab 136 that can be used to help keep the lid in a folded position. Glue or another type of adhesive may be used to secure the tab to a portion of the lid to keep the lid in a folded position for packaging and shipping. As noted above, the surfaces of the lid may be different to help keep packaged food warmer while maintaining the ability to fold the lid. For example, one side 138 of the lid may be aluminum (FIG. 12), while the other side may be made of a thin cardboard 140 (FIG. 11). The cardboard permits the lid to be folded for packaging and unfolded for use, while the aluminum side provides for the ability to keep moisture out and/or help maintain the heat within the pan when closed and re-heating.

Figure 13:
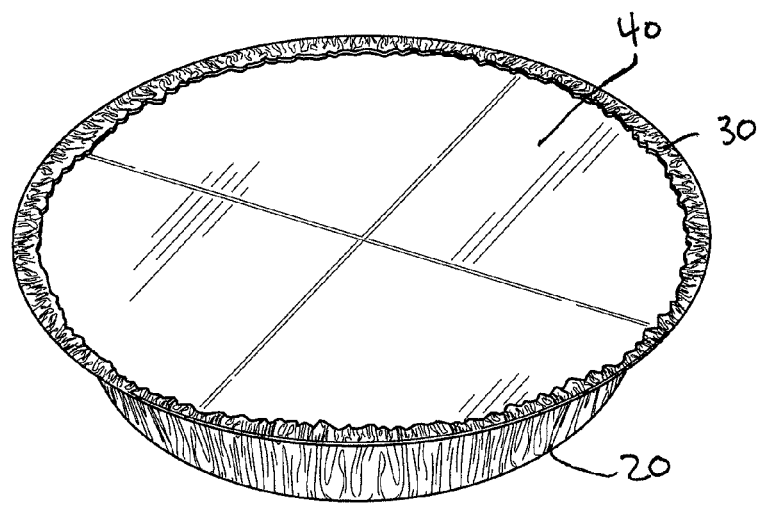
FIG. 13 is a perspective view of the pan and lid from FIG. 1.
Figure 14:
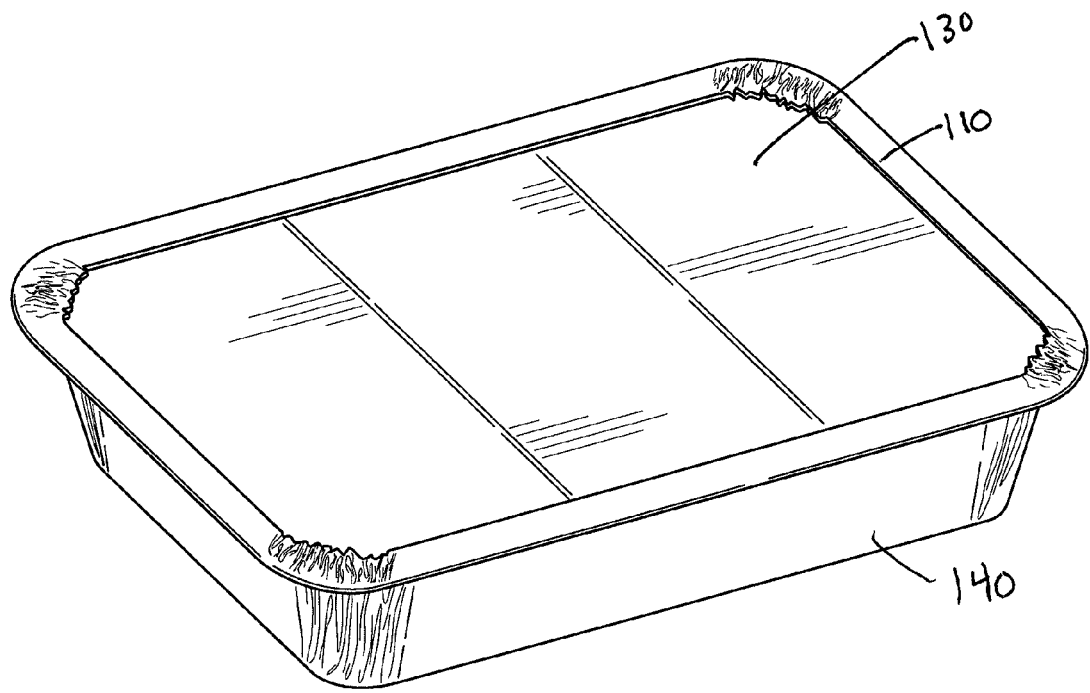
FIG. 14 is a perspective view of the pan and lid from FIG. 8.
Figure 15:
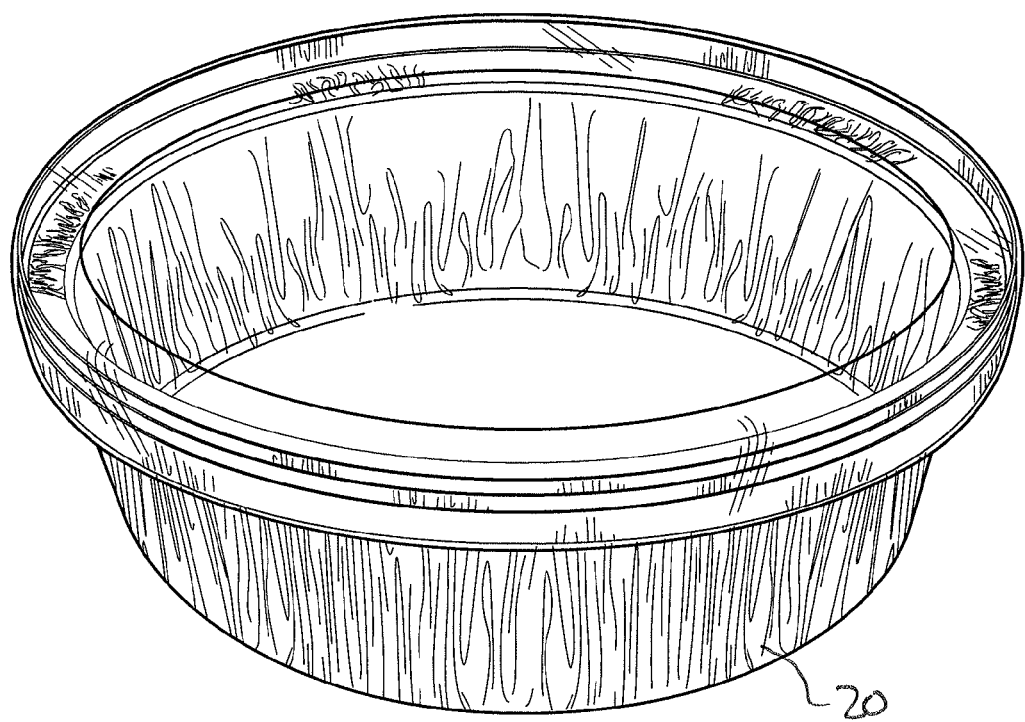
FIG. 15 is a perspective view of the packaged pans and lids illustrated in accordance to a third embodiment of the present invention.
Figure 16:
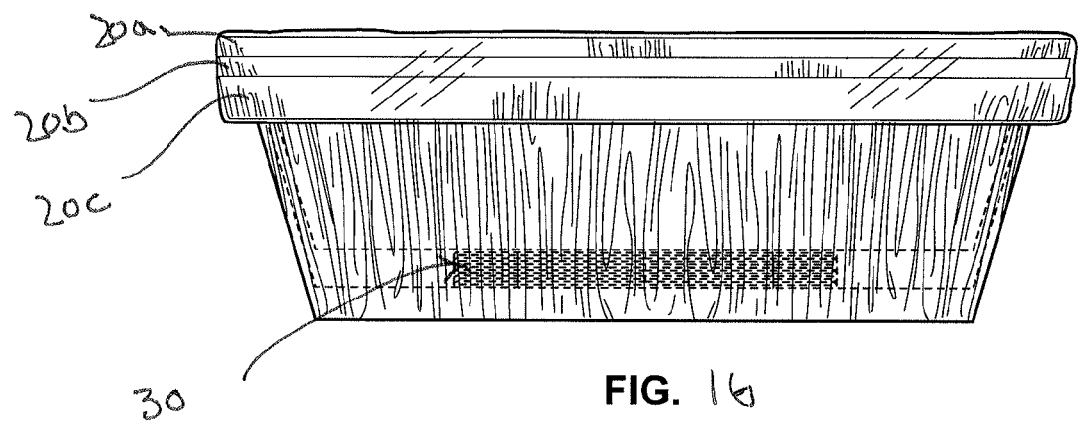
FIG. 16 is a side view of FIG. 15.
Figure 17:
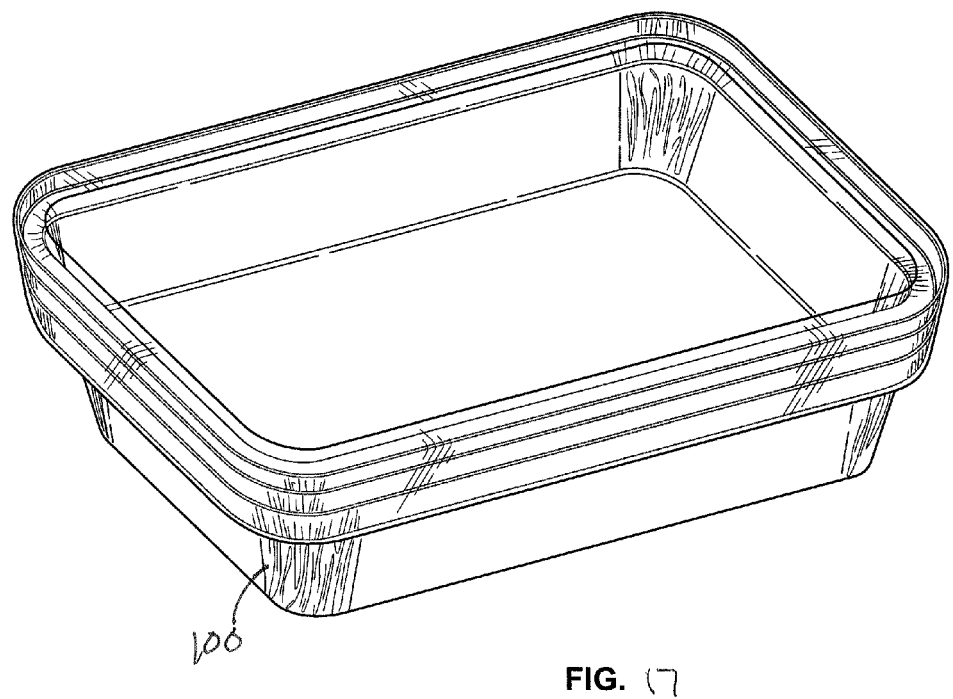
FIG. 17 is a perspective view of the packaged pans and lids illustrated in accordance to a fourth embodiment of the present invention.
Figure 18:
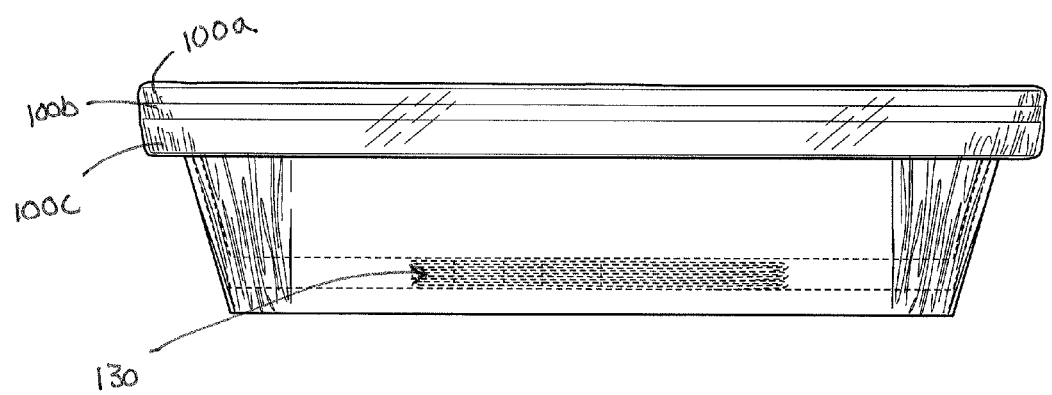
FIG. 18 is a side view of FIG. 17.

It should be known that the number of fold lines is not important. The aspect of the invention is that the folded lid is sized such that it easily fits within the well of the pan and then is unfolded to a substantially flat configuration, such that the edges of the lid fits onto the rim of the pan. Referring now to FIGS. 13 and 14, there is shown the pan (20 and 100) and lid (40 and 130) as the lid is unfolded, resting on the rim, and having the lip (30 and 110) folded over to secure the lid on to the pan.

Referring now to FIGS. 15-18, there are shown additional embodiments that define pans 20 (100) packaged together with the lids 40 (130) positioned between at least two of the pans. In this embodiment, the lids 40 (130) are secured between two adjacent pans 20 (100) and the likelihood that a lid is prematurely removed or lost is reduced.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A packaged pan and lid comprising:
   a pan having a well with a bottom surface and a single continuous wall surface extending upwardly from the bottom surface, a rim extending outwardly from an upper edge of the wall surface and a lip extending upwardly from a terminus of the rim;
   a lid having at least one bilateral fold line across the lid, such that the lid is configurable into a folded configuration, the lid being configured into the folded configuration and being removable secured within the well of the pan, such that the lid is removable from the well and unfolded to a substantially flat configuration; and
   wherein the lip is configured to bend over the edge of the lid when the lid is unfolded to a substantially flat configuration and positioned such that the perimeter of the lid is positioned on the rim, and
   wherein the lid further includes at least two corner sections removably attached to a perimeter edge of the lid by a perforated edge.

2. The pan and lid of claim 1, wherein the at least two corner sections include an adhesive such that the two corner sections are secured together when the lid is in a folded configuration such that the lid is maintained in the folded configuration until the adhesive between the two corner sections is broken or the two corner sections are removed.

3. The pan and lid of claim 1, wherein the lid includes a first surface side that is made of an aluminum material and includes a second surface side that is made of a cardboard material.

4. The pan and lid of claim 1, wherein the pan and lid have a polygonal Configuration.

5. The pan and lid of claim 1, wherein the pan and lid have an elliptical shaped configuration.

6. The pan and lid of claim 5, wherein the lid further includes a pair of cross bilateral folding lines, such that the lid has a folded configuration that is sized to be about a quarter of the unfolded substantially flat configuration.

7. A packaged pan and lid comprising:
a pan having a well with a bottom surface and a single continuous wall surface extending upwardly from the bottom surface, a rim extending outwardly from an upper edge of the wall surface and a lip extending upwardly from a terminus of the rim;
a lid having at least one fold line across the lid ,such that the lid is configurable into a folded configuration, the lid being configured into the folded configuration and being positioned within the well of the pan, such that the lid is removable from the well and unfolded to a substantially flat configuration; and
wherein the lip is configured to bend over the edge of the lid when the lid is unfolded to a substantially flat configuration and positioned such that the perimeter of the lid is positioned on the rim, and
wherein the lid further includes a flap removable secured to an edge of the lid and when the lid is in the folded configuration the flap is secured to a portion of the lid by an adhesive to maintain the lid in a folded configuration.

8. A packaged pan and lid comprising:
at least two nested pans, each pan having a well with a bottom surface and a single continuous wall surface extending upwardly from the bottom surface, a rim extending outwardly from an upper edge of the wall surface and a lip extending upwardly from a terminus of the rim, and wherein one of the nested pans is positioned in the other nested pan such that the wells of the nested pans substantially abut each other;
at least two lids corresponding to t le at least two nested pans, each lid having at least two bi-lateral fold lines across the lid, such that the lid is configurable into a folded configuration, the lid being configured into the folded configuration and being removable secured within the well of a corresponding pan, such that the lid is removable from the well and unfolded to a substantially flat configuration, and wherein the lip is configured to bend over the edge of the lid when the lid is unfolded to a substantially flat configuration and positioned such that the perimeter of the lid is positioned on the rim; and
a band made out of a heat-shrinkable plastic being placed around the outwardly-extending rim and lip of the nested pans, and
wherein each lid further includes a pair of cross bi- lateral folding lines, such that the lids have a folded configuration that is sized to be about a quarter of the unfolded substantially flat configuration and wherein each lid further includes at least two corner sections removably attached to a perimeter edge of the lid by a perforated edge.

9. The pan and lid of claim 8, wherein the pans and lids have an elliptical shaped configuration.

10. The pan and lid of claim 8, wherein the at least two corner sections include an adhesive such that the two corner sections are secured together when the lid is in a folded configuration such that the lid is maintained in the folded configuration until the adhesive between the two corner sections is broken or the two corner sections are removed.

11. The pan and lid of claim 8, wherein the lid includes a first surface side that is made of an aluminum material and includes a second surface side that is made of a cardboard material.

12. The pan and lid of claim 8, wherein each pan and lid has a polygonal configuration.

13. The pan and lid of claim 12, wherein each lid further includes a pair of bi-lateral folding lines, such that the lid has a folded configuration that is sized to be about a third of the unfolded substantially flat configuration.

14. A packaged pan and lid comprising:
at least two nested pans, each pan having a well with a bottom surface and a single continuous wail surface extending upwardly from the bottom surface, a rim extending outwardly from an upper edge of the wall surface and a lip extending upwardly from a terminus of the rim, and wherein one of the nested pans is positioned in the other nested pan such that the wells of the nested pans substantially abut each other;
at least two lids corresponding to the at least two nested pans, each lid having at least two bi-lateral fold lines across the lid, such that the lid is configurable into a folded configuration, the lids being configured into the folded configuration and being removable secured within the well of one of the pans positioned below another pan, such that the at least two lids are secured between the at least two nested pans, and wherein the at least two lids are removable from the well when the at least two nested pans are separated, and each of the lids being adapted to unfold to a substantially flat configuration, and wherein the lip is configured to bend over the edge of the lid when the lid is unfolded to a substantially flat configuration and positioned such that the perimeter of the lid is positioned on the rim; and
a band made out of a heat-shrinkable plastic being placed around the outwardly-extending rim and lip of the nested pans, and
wherein each lid further includes at least one corner section removably attached to a perimeter edge of the lid by a perforated edge.

15. The pan and lid of claim 14, wherein the at least two corner sections include an adhesive such that the two corner sections are secured together when the lid is in a folded configuration such that the lid is maintained in the folded configuration until the adhesive between the two corner sections is broken or the two corner sections are removed.

16. The pan and lid of claim 14, wherein the lid includes a first surface side that is made of an aluminum material and includes a second surface side that is made of a cardboard material.

17. The pan and lid of claim 14, wherein the pans and lids have an elliptical shaped configuration.

18. The pan and lid of claim 17, wherein each lid further includes a pair of cross bilateral folding lines, such that the lids have a folded configuration that is sized to be about a quarter of the unfolded substantially flat configuration.

19. The pan and lid of claim 14, wherein each pan and lid has a polygonal configuration.

20. The pan and lid of claim 19, wherein each lid further includes a pair of bi-lateral folding lines, such that the lid has a folded configuration that is sired to be about a third of the unfolded substantially flat configuration.

21. A packaged pan and lid comprising:
- a pan having a well with a bottom surface and a single continuous wall surface extending upwardly from the bottom surface, a rim extending outwardly from an upper edge of the wall surface and a hp extending upwardly from a terminus of the rim;
- a lid having a fold line across the lid, such that the lid is configurable into a folded configuration, the lid being configured into the folded configuration and being positioned within the well of the pan, such that the lid is removable from the well and unfolded to a substantially flat configuration, and wherein the lip is configured to bend over the edge of the lid when the lid is unfolded to a substantially flat configuration and positioned such that the perimeter of the lid is positioned on the rim; and
- wherein the lid further includes at least a section removably attached to a perimeter edge of the lid by a perforated edge.

22. The pan and lid of claim 21, wherein the removably attached section includes an adhesive such that the section is removably secured to the pan.

23. The pan and lid of claim 21, wherein the lid includes a pair of removably attached sections attached to a perimeter edge of the lid by perforated edges, and configured to lie over one another when the lid is in a folded configuration and further comprising adhesive positioned between the two sections to maintain the lid in a folded configuration when positioned in the well of the pan.

24. The pan and lid of claim 23 further comprising a second adhesive positioned on one of the two sections to removably secure the lid to the pan.

\* \* \* \* \*